(12) United States Patent
Lange (10) Patent No.: US 7,640,088 B2
(45) Date of Patent: Dec. 29, 2009

(54) METHOD AND SYSTEM FOR CONTROLLING STEERING DEADBAND IN A MOBILE MACHINE

(75) Inventor: Arthur F. Lange, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 905 days.

(21) Appl. No.: 11/019,698

(22) Filed: Dec. 21, 2004

(65) Prior Publication Data

US 2006/0015228 A1    Jan. 19, 2006

Related U.S. Application Data

(63) Continuation-in-part of application No. 10/892,002, filed on Jul. 14, 2004, now Pat. No. 7,188,015.

(51) Int. Cl.
*B62D 5/04* (2006.01)
(52) U.S. Cl. .......................................... 701/41; 180/422
(58) Field of Classification Search .................. 701/41, 701/42, 44; 180/422, 421, 446, 408, 415; 706/900, 905
See application file for complete search history.

(56) References Cited

U.S. PATENT DOCUMENTS

| 2,805,585 | A | | 9/1957 | Besserman |
| 4,624,334 | A | * | 11/1986 | Kelledes et al. ............. 180/446 |
| 6,442,463 | B1 | * | 8/2002 | Qiu et al. ...................... 701/44 |
| 6,595,045 | B1 | * | 7/2003 | Fuglewicz et al. ............. 73/129 |
| 6,738,695 | B1 | * | 5/2004 | Motz et al. ..................... 701/23 |
| 6,863,144 | B2 | * | 3/2005 | Brandt et al. ................. 180/333 |
| 7,142,956 | B2 | * | 11/2006 | Heiniger et al. ............... 701/23 |
| 7,369,923 | B2 | * | 5/2008 | Yamakawa et al. ............ 701/21 |
| 2002/0138187 | A1 | | 9/2002 | Qiu et al. |
| 2004/0210357 | A1 | | 10/2004 | McKay et al. |

FOREIGN PATENT DOCUMENTS

WO    WO 2004/095198 A2    4/2004

OTHER PUBLICATIONS

Harries, G.O. et al., "Automatic Ploughing: A Tractor Guidance System Using Opto-Electronic Remote Sensing Techniques and a Microprocessor Based Controller", (1981),21.

* cited by examiner

*Primary Examiner*—Dalena Tran

(57) ABSTRACT

A method and system for controlling steering dead band in a mobile machine is described. The method includes measuring the dead band, storing a value corresponding to thereto, and applying the dead band value to a controller of a steering mechanism. The steering mechanism is thus controlled according to the dead band value to compensate for the dead band.

8 Claims, 11 Drawing Sheets

```
┌─────────────────────────────────────────────┐
│ Remove Free Play from Steering Mechanism by │
│ Turning Steering Mechanism in 1st Direction │
│ until Ground Wheels First Move   801        │
└─────────────────────────────────────────────┘
                      ↓
┌─────────────────────────────────────────────┐
│     Note 1st Position of Steering Mechanism │
│                      802                    │
└─────────────────────────────────────────────┘
                      ↓
┌─────────────────────────────────────────────┐
│   Actuate Steering Mechanism in Second      │ ←─┐
│   Direction (Opposite from 1st Direction)   │   │
│                      803                    │   │
└─────────────────────────────────────────────┘   │
                      ↓                           │
                 ╱ Wheels Move? ╲ ──── No ────────┘
                 ╲     804     ╱
                      ↓
                     Yes
                      ↓
┌─────────────────────────────────────────────┐
│ Note 2nd Position of Steering Mechanism at  │
│       which Ground Wheels First Move        │
│                      805                    │
└─────────────────────────────────────────────┘
                      ↓
┌─────────────────────────────────────────────┐
│    Ascertain Difference between 2nd & 1st   │
│                  Positions                  │
│                      806                    │
└─────────────────────────────────────────────┘
                      ↓
┌─────────────────────────────────────────────┐
│   Save Difference between 2nd & 1st Positions│
│                      807                    │
└─────────────────────────────────────────────┘
```

METHOD AND SYSTEM FOR CONTROLLING STEERING DEADBAND IN A MOBILE MACHINE

RELATED U.S. APPLICATION

This application is a Continuation-in-Part of U.S. patent application Ser. No. 10/892,002 by Arthur Lange, et al., entitled A Method and System for Controlling a Mobile Machine, filed on Jul. 14, 2004 now U.S. Pat. No. 7,188,015 and assigned to the Assignee of the present invention. To the extent it is not repeated, this related application is incorporated herein by reference.

TECHNICAL FIELD

The present invention relates generally to controlling a mobile machine. More specifically, embodiments of the present invention relate to controlling steering dead band in a mobile machine.

BACKGROUND

Modern utility vehicles perform various functions in fields including agriculture, construction, road and lot maintenance, mining, surveying, and others. In many activities related to such fields, some vehicle operations tend to be repetitive. While this discussion pertains to all such fields and vehicles used therein, for clarity and brevity, the discussion herein will focus on agricultural vehicles for illustration and explanation.

Operating agricultural vehicles such as tractors, harvesters and the like can involve such repetitiveness. For instance, when plowing or planting a field, an operator must make repeated passes across a field, which may be of significant area (e.g., acreage, etc.). Due to the repetitive nature of the work and irregularities in the terrain, gaps and overlaps in the rows of crops can occur. This can result in damaged crops, overplanting, or reduced yield per acre. As the size of agricultural vehicles and farming implements continues to increase, precisely controlling their motion becomes more important.

Guidance systems are increasingly used for controlling agricultural and environmental management equipment and operations such as road side spraying, road salting, and snow plowing where following a previously defined route is desirable. This allows more precise control of the vehicles than is typically realized than if the vehicle is steered by a human. Many rely upon furrow followers which mechanically detect whether the vehicle is moving parallel to a previously plowed plant furrow. However, these guidance systems are most effective in flat terrain and when detecting furrows plowed in a straight line. Additionally, many of these systems require factory installation and are too expensive or inconvenient to facilitate after market installation.

Further, almost all utility vehicles and machines used in agricultural and similar activities are characterized by some amount of discrepancy in the positioning of its steering control (e.g., a steering wheel), with respect to the actual direction the wheels of the vehicle are oriented towards therewith. This discrepancy is commonly referred to as "play" in the steering mechanism, which can be characterized by a dead band in coupling the steering wheel to the vehicle's wheels. The term "dead band" or steering play refers to the fact that there is no change in the position of the guidance wheel touching the ground as the steering wheel is moved. The range of this dead band can vary from vehicle to vehicle, e.g., from tractor to tractor. Such steering play can adversely affect the performance of guidance systems.

Steering play is frequently related to a sum of various mechanical alignments, adjustments, slow and cumulative mechanical changes, such as are associated with loosening, wear and tear on linkages, hydraulic actuators, valves, leakage and pressure changes, etc. Steering play is thus typically more pronounced in older vehicles than in newer ones. Further, older vehicles typically wear, loosen and otherwise change position at faster rates than newer ones. Thus, steering play in older vehicles may increase after relatively shorter operational periods and/or lighter operational duty.

Such play can cause variation and/or errors in positioning the vehicle for one or more of many repetitive operations. Such variation requires correction, which can occupy an operator's attention and efforts, such as for manual compensation, adjustment of a guidance system, etc. Occupying the operator's attention can distract the operator, which can have concomitant negative safety and economic effects. Occupying the operator's efforts makes operating the vehicle more strenuous or troublesome than it would otherwise be.

Further, such errors can cause consequences such as that some portions of land to be subject to the vehicle's activity are actually missed, and others are unnecessarily exposed to repetition thereof. Both such consequences can have negative economic and other effects. For instance, where a portion of crops is missed by plow, seed, fertilizer, pesticide, etc., that portion may be unproductive, or the vehicle's activities may need to be repeated (or substituted with other activity, e.g., corrective manual activity or activity of another vehicle) to cover the missed portion. Unnecessary exposure of another region, e.g., proximate to the missed portion, can occur with such repetition, which can be wasteful and/or harmful. Some economic cost typically inheres with the repetition itself. And for instance, where excess seed, fertilizer, pesticide, etc. is inadvertently (e.g., inaccurately, mistakenly, etc.) applied to a previously covered region proximate to the missed portion, crops can be less productive or barren in that proximate region.

SUMMARY

Accordingly, a need exists for a method and system for guiding mobile machines such as agricultural and other vehicles, which mitigate undesirable guidance-related and other effects associated with steering play. It is also desirable that such a method and system mitigate such undesirable steering play-related effects automatically. Further, it is desirable that such a system be implemented in a configuration that can compliment automatic steering control navigational guidance and that is suitable for after market installation in those vehicles.

A method and system for controlling steering dead band in a mobile machine is disclosed. The method includes having the vehicle operator make a manual measurement of the dead band, manually storing a value corresponding to thereto, and using the dead band value in a controller of a steering mechanism. The steering mechanism is thus controlled according to the dead band value to compensate for the dead band. The method and system automatically mitigates undesirable guidance-related and other effects associated with the dead band, which characterizes the steering play. This system is implemented, in one embodiment, to compliment automatic steering control navigational guidance and is suitable for after market installation in vehicles. Such vehicles may include agricultural vehicles such as tractors, combines, harvesters and the like, as well as utility, commercial, construction, and maintenance vehicles. The manual measurement saves considerable cost by eliminating the cost of an expensive set of sensors.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION

Embodiments of the present invention are directed to a method and system for controlling steering dead band in a mobile machine. Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims and their equivalents.

Furthermore, in the following detailed description of embodiments of the present invention, numerous specific details are set forth in order to provide a thorough understanding of the present invention. However, embodiments of the present invention may be practiced without these specific details. In other instances, well-known methods, systems, procedures, components, circuits, devices and apparatus, etc., have not been described in detail so as not to unnecessarily obscure aspects of the present invention.

Portions of the detailed description that follows are presented and discussed in terms of processes. Although steps and sequencing thereof are disclosed in figures herein (e.g., FIGS. 6-10) describing the operations of these processes (e.g., processes 600-1000, respectively), such steps and sequencing are exemplary. Embodiments of the present invention are well suited to performing various other steps or variations of the steps recited in the flowcharts of the figures herein, and in a sequence other than that depicted and described herein.

Embodiments of the present invention provide a method and system for controlling steering dead band in a mobile machine. In one embodiment, the method includes measuring the dead band, storing a value corresponding to thereto, and applying the dead band value to a controller of a steering mechanism. The steering mechanism is thus controlled according to the dead band value to compensate for the dead band.

Therefore, undesirable guidance-related and other effects associated with dead band, which characterizes steering play, are mitigated. Advantageously, the system is implemented, in one embodiment, to compliment automatic steering control navigational guidance and is suitable for after market installation in vehicles, which can prolong the useful operational life of vehicles and mobile machines, especially those whose duty nature and cycles cause steering mechanism wear.

SECTION I

Exemplary Mobile Machine Control Platform and Process

Embodiments of the present invention relate to a method and system for controlling steering dead band in a mobile machine. The description of the method and system for controlling steering dead band in a mobile machine commences at Section II at FIG. 7. Presented first, Section I, FIGS. 1-6 represent a discussion of an exemplary method and system for controlling a mobile machine, to provide context to the discussion of the method and system for controlling steering dead band in a mobile machine, of Section II.

Figure 1A:
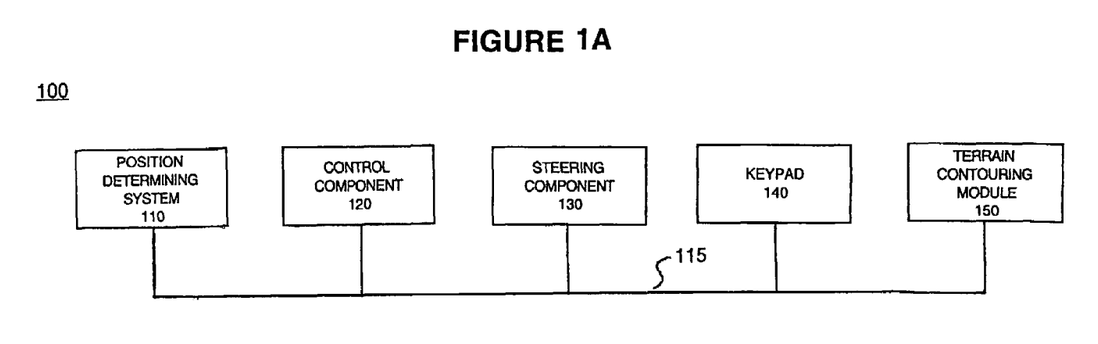
FIGS. 1A and 1B show an exemplary system for controlling a mobile machine in accordance with embodiments of the present invention.
Figure 1B:
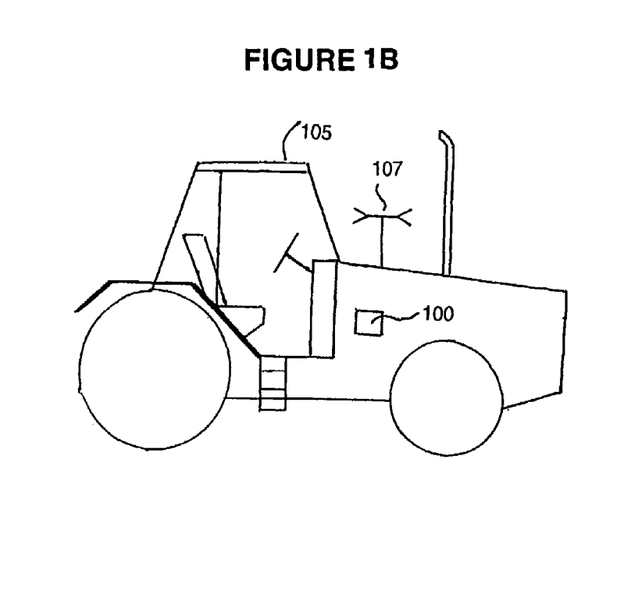

FIG. 1 is a block diagram of an exemplary system 100 for controlling a mobile machine 105 in accordance with embodiments of the present invention. In FIG. 1, a position determining system is coupled with a control component 120 and a steering component 130 via a communication network or coupling 115. Additionally, system 100 may comprise an optional keypad 140 and/or a terrain compensation module component (e.g., TCM 150) which are also coupled with coupling 115.

In embodiments of the present invention, coupling 115 is a serial communications bus. In one embodiment, coupling 115 is compliant with, but not limited to, the controller area network (CAN) protocol. CAN is a serial bus system which was developed for automotive use in the early 1980s. The Society of Automotive Engineers (SAE) has developed a standard CAN protocol, SAE J1939, based upon CAN specification 2.0. The SAE J1939 specification provides plug-and-play capabilities and allows components from various suppliers to be easily integrated in an open architecture.

Position determining system 110 determines the geographic position of mobile machine 105. For the purposes of the present invention, the term "geographic position" means the determining in at least two dimensions (e.g., latitude and longitude), the location of mobile machine 105. In one embodiment of the present invention, position determining system 110 is a satellite based position determining system and receives navigation data from satellites via antenna 107 of FIG. 1B. Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present invention are well suited for using other position determining systems as well such as ground-based position determining systems, or other satellite-based position determining systems such as the GLONASS system, or the Galileo system currently under development.

In embodiments of the present invention, control component 120 receives position data from position determining system 110 and generates commands for controlling mobile machine 105. In embodiments of the present invention, mobile machine 105 is an agricultural vehicle such as a tractor, a harvester, etc. However, embodiments of the present invention are well suited for controlling other vehicles such as snow plows, road salting, or roadside spraying equipment as well. In one embodiment, is response to position data received from position determining system 110, control component 120 generates a message (e.g., a steering command) to steering component 130 which then controls the steering mechanism of mobile machine 105. In embodiments of the present invention, control component 120 is operable for generating steering commands to an electrical steering component and a hydraulic steering component depending upon the configuration of system 100.

In embodiments of the present invention, keypad 130 provides additional input/output capabilities to system 100. In embodiments of the present invention, keypad 130 may also comprise a device drive 131 which allows reading a media storage device such as a compact disk (CD), a digital versatile disk (DVD), a memory stick, or the like. This allows, for example, integrating data from various software applications such as mapping software in order to facilitate controlling the movement of mobile machine 105. For example, field boundaries can be easily input into system 100 to facilitate controlling the movement of mobile machine 105.

TCM 150 provides the ability to compensate for terrain variations which can reduce the precision of position determining system 110 in determining the geographic position of mobile machine 105. For example, when traversing a hillside, the antenna 107 of the position determining system 110 can be displaced to one side or the other with respect to the center line of mobile machine 105, thus causing errors in determining the geographic position of mobile machine 105. As a result, gaps or overlaps can occur when plowing across contoured terrain is being performed. TCM 150 can detect the magnitude of displacement of antenna 107 with respect to the center line of mobile machine 105 (e.g., due to roll, pitch, and yaw) and send signals which allow control component 120 to generate steering commands which compensate for the errors in determining the geographic position of mobile machine 105. It is appreciated that the components described with reference to FIG. 1 may be implemented as separate components. However, in embodiments of the present invention, these components may be integrated as various combinations of discreet components, or as a single device.

Figure 2:
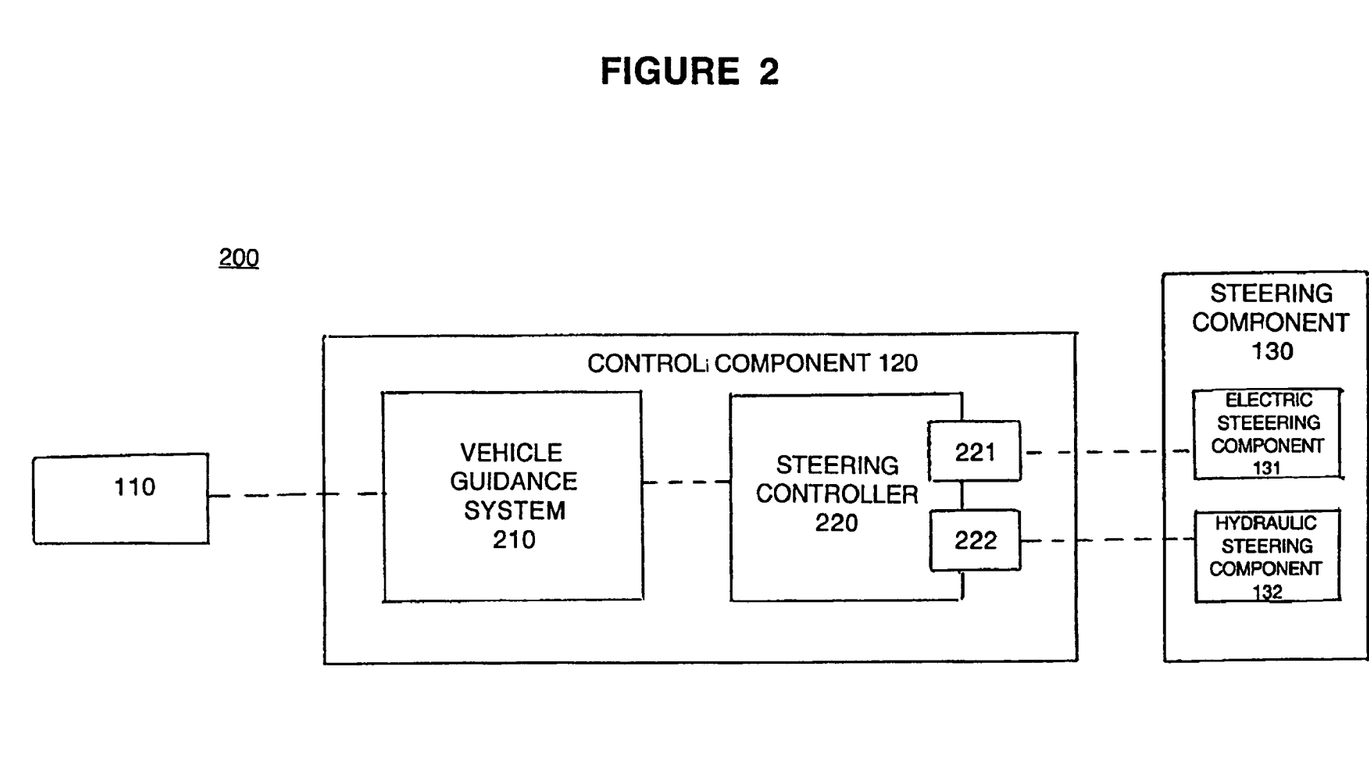
FIG. 2 shows an exemplary system architecture in accordance with embodiments of the present invention.

FIG. 2 shows an exemplary system architecture 200 in accordance with embodiments of the present invention. In the embodiment of FIG. 2, control component 120 comprises a vehicle guidance system 210 which is coupled with a steering controller 220. It is appreciated that in embodiments of the present invention, vehicle guidance system 210 and steering controller 220 may be implemented as a single unit, or separately. Implementing steering controller 220 separately is advantageous in that it facilitates implementing the present invention as an after market kit which can be easily added to an existing vehicle navigation system. As a result, the costs for components and for installation of the control system of the present invention are reduced. However, embodiments of the present invention are well suited to be factory installed as original equipment for mobile machine 105 as well. In one embodiment, vehicle guidance system 210 operates to compensating for a dead band in the steering mechanism of the vehicle.

In embodiments of the present invention, vehicle guidance system 210 uses position data from position determining system 110, user input such as a desired pattern or direction, as well as vector data such as desired direction and distance to determine course corrections which are used for guiding mobile machine 105. Roll, pitch, and yaw data from TCM 150 may also be used to determine course corrections for mobile machine 105. For purposes of the present invention, the term "course correction" means a change in the direction traveled by mobile machine 105 such that mobile machine 105 is guided from a current direction of travel to a desired direction of travel. In embodiments of the present invention, vehicle guidance system 210 is a commercially available guidance system such as the AgGPS® guidance system manufactured by Trimble Navigation Ltd. of Sunnyvale Calif.

Additional data used to determine course corrections may also comprise swath calculation which takes into account the width of various implements which may be coupled with mobile machine 105. For example, if a harvester can clear a swath of 15 feet in each pass, vehicle guidance system 210 may generate steering commands which cause mobile machine 105 to move 15 feet to one side in the next pass. Vehicle guidance system 210 may also be programmed to follow straight or curved paths which is useful when operating in irregularly shaped or contoured fields or in fields disposed around a center pivot. This is also useful in situations in which the path being followed by mobile machine 105 is obscured. For example, an operator of a snowplow may not be able to see the road being cleared due to the accumulation of snow on the road. Additionally, visibility may be obscured by snow, rain, or fog. Thus, it would be advantageous to utilize embodiments of the present invention to guide mobile machine 105 in these conditions. In embodiments of the present invention, position determining component 110 may be integrated into vehicle guidance system 210 or may be a separate unit. Additionally, as stated above with reference to FIG. 1, position determining component 110, control component 120 and steering component 130 may be integrated into a single unit in embodiments of the present invention.

In embodiments of the present invention, the course correction calculated by vehicle guidance system 210 is sent from vehicle guidance system 210 to steering controller 220.

Steering controller 220 translates the course correction generated by guidance system 210 into a steering command for manipulating the steering mechanism of mobile machine 105. Steering controller 220 generates a message conveying the steering command to steering component 130. In embodiments of the present invention, the communicative coupling between vehicle guidance system 210, steering controller 220 and steering component 130 is accomplished using coupling 115 (e.g., a serial bus, or CAN bus).

In embodiments of the present invention, steering component 130 may comprise an electric steering component 131, or a hydraulic steering component 132. Thus, as shown in FIG. 2, steering controller 220 comprises a first output 221 for coupling steering controller 220 with electric steering component 131, and a second output 222 for coupling steering controller 220 with hydraulic steering component 132. Because coupling 115 may be compliant with the CAN protocol, plug and play functionality is facilitated in system 200. Therefore, in embodiments of the present invention, steering controller can determine which steering component it is coupled with depending upon which output of steering controller 220 is used.

Steering controller 220 then generates a message, based upon the steering component with which it is coupled, which causes the steering component to actuate the steering mechanism of mobile machine 105. For example, if steering controller 220 determines that output 221 is being used, it generates a steering command which is formatted for controlling electric steering component 131. If steering controller 220 determines that output 222 is being used, it generates a steering command which is formatted for controlling hydraulic steering component 132.

Figure 3A:
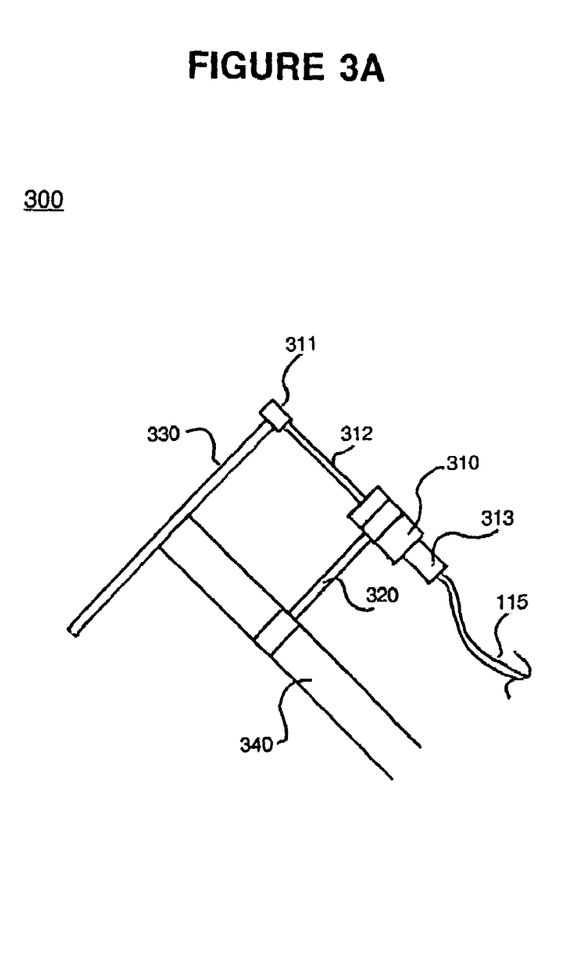
FIGS. 3A and 3B show side and top views respectively of an exemplary system for controlling a mobile machine in accordance with embodiments of the present invention.
Figure 3B:
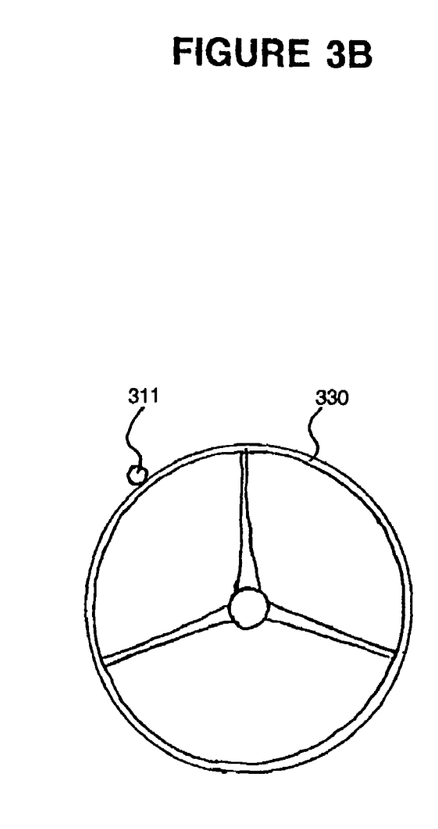

FIGS. 3A and 3B show side and top views respectively of a system 300 for controlling a mobile machine in accordance with embodiments of the present invention. In the embodiment of FIG. 3A, a steering component (e.g., electric steering component 131 of FIG. 2) comprises an electric motor 310 which is coupled with an actuator device via a shaft 312. In the embodiment of FIG. 3A, actuator device comprises a drive wheel 311 which is in contact with steering wheel 330 of mobile machine 105. In embodiments of the present invention, electric motor 310 may be directly coupled with drive wheel 311, or may be coupled via a low ratio gear (not shown). Using these methods to couple electric motor 313 and drive wheel 311 are advantageous in that a smaller electric motor can be used while still generating sufficient torque to control steering wheel 330. Thus, if a user wants to manually steer mobile machine 105, the user will encounter less resistance from electric motor 310 when it is disengaged.

Electric steering component 131 further comprises a motor control unit 313 is coupled with electric motor 310 and with a control component 120 of FIG. 2 via coupling 115. In FIG. 3A, electric motor 310 is coupled with the steering column 340 via a bracket 320. It is appreciated that in embodiments of the present invention, electric motor 310 may be coupled with steering column 340 using another apparatus than bracket 320. For example, in one embodiment, electric motor 310 may be coupled with a bracket which is attached via suction cups with the windshield or dashboard of mobile machine 105. In another embodiment, electric motor 310 may be coupled with a pole which is extended between the floor and roof of mobile machine 105. Furthermore, while the present embodiment shows motor control unit 313 directly coupled with electric motor 310, embodiments of the present invention are well suited to utilize other configurations. For example, in one embodiment motor control unit 313 may be implemented as a sub-component of control unit 120 and may only send a control voltage to electric motor 310 via an electrical coupling (not shown). In another embodiment, motor control unit 313 may be implemented as a separate unit which is communicatively coupled with control unit 120 via coupling 115 and with electric motor 310 via an electrical coupling (not shown).

In embodiments of the present invention, drive wheel 311 is coupled with steering wheel 330 with sufficient friction such that rotation of drive 311 causes rotation of steering wheel 330. In embodiments of the present invention, a spring (not shown) maintains sufficient pressure for coupling drive wheel 311 with steering wheel 330. However, the spring does not maintain sufficient pressure between drive wheel 311 and steering wheel 330 to pinch a user's fingers if, for example, the user is manually steering mobile machine 105 and the user's fingers pass between drive wheel 311 and steering wheel 330.

In embodiments of the present invention, electric motor 310 is reversible, thus, depending upon the steering command sent from control component 120, motor control unit 313 controls the current to electric motor 310 such that it rotates in a clockwise of counter-clockwise direction. As a result, steering wheel 330 is turned in a clockwise or counter-clockwise direction as well. Typically, the current running through electric motor 310 is calibrated so that drive wheel 311 is turning steering wheel 330 without generating excessive torque. This facilitates allowing a user to override electric steering component 131. In embodiments of the present invention, electric motor 310 may be a permanent magnet brush direct current (DC) motor, a brushless DC motor, a stepper motor, or an alternating current (AC) motor.

In embodiments of the present invention, motor control unit 313 can detect when a user is turning steering wheel 330 in a direction counter to the direction electric steering component 131 is turning. For example, a shaft encoder (not shown) may be used to determine which direction shaft 312 is turning. Thus, when a user turns steering wheel 330 in a direction which counters the direction electric motor 310 is turning, the shaft encoder detects that the user is turning steering wheel 330 and generates a signal to motor control unit 313. In response to determining that a user is turning steering wheel 330, motor control unit 313 can disengage the power supplied to electric motor 310. As a result, electric motor 310 is now freewheeling and can be more easily operated by the user. In another embodiment, motor control unit 313 when steering wheel 330 is turned counter to the direction electric motor is turning, a circuit in motor control unit 313 detects that electric motor 310 is stalling and disengages the power supplied to electric motor 310. In another embodiment, a switch detects the rotation of steering wheel 330 and sends a signal to motor control unit 313. Motor control unit 313 can then determine that the user is manually steering mobile machine 105 and disengage electric motor 310. As a result, when a user turns steering wheel 330, their fingers will not be pinched if they pass between drive wheel 311 and steering wheel 330 because electric motor 310 is freewheeling when the power is disengaged.

Embodiments of the present invention are advantageous over conventional vehicle control systems in that it can be easily and quickly installed as an after market kit. For example, conventional control systems typically control a vehicle using solenoids and hydraulic flow valves which are coupled with the power steering mechanism of the vehicle. These systems are more difficult to install and more expensive than the above described system due to the higher cost of the solenoids and hydraulic flow valves as well as the additional labor involved in installing the system. The embodiment of FIG. 3 can be easily bolted onto steering column 340 and coupled with steering controller 220. Additionally, electric motor 310 can be fitted to a variety of vehicles by simply exchanging bracket 320 for one configured for a particular vehicle model. Furthermore, embodiments of the present invention do not rely upon furrow feelers which typically must be raised from and lowered into a furrow when the end of the furrow is reached. As a result, less time is lost in raising or lowering the furrow feeler.

Figure 4A:
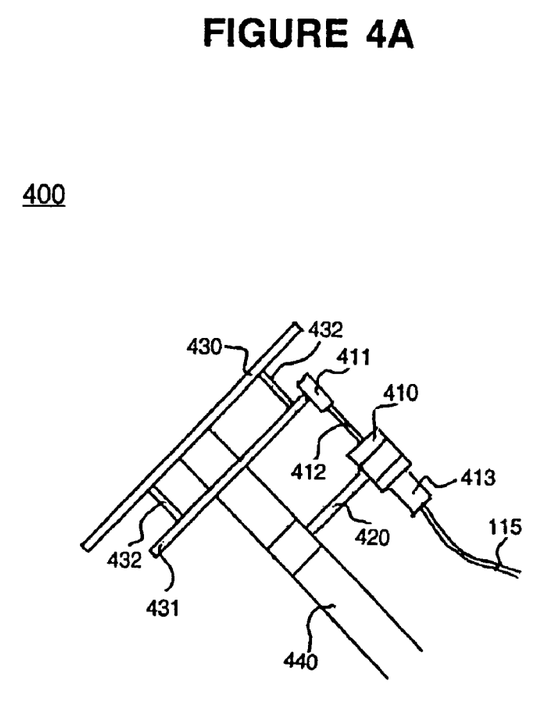
FIGS. 4A and 4B show side and top views respectively of an exemplary system for controlling a mobile machine in accordance with embodiments of the present invention.
Figure 4B:
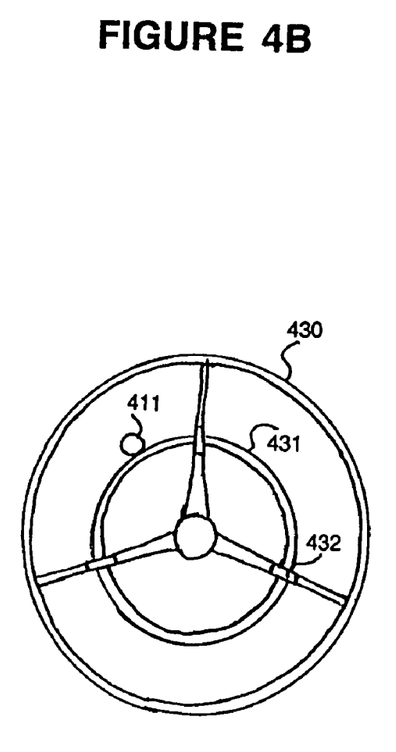

FIGS. 4A and 4B show side and top views respectively of a system 400 for controlling a mobile machine in accordance with embodiments of the present invention. In FIG. 4A, the steering component (e.g., electric steering component 131 of FIG. 2) comprises an electric motor 410 which is coupled with drive wheel 411 via shaft 412 and a motor control unit 413. Motor control unit 413 couples electric motor 410 with steering controller 220 of FIG. 2. In FIG. 4A, electric motor 410 is with steering column 440 via bracket 420. In the embodiment of FIGS. 4A and 4B, drive wheel 411 is coupled with a sub wheel 431 which is coupled with steering wheel 330 via brackets 432.

In the embodiment of FIGS. 4A and 4B, electric motor 410 turns in a clockwise or counter-clockwise direction depending upon the steering command received by motor control unit 413. As a result, drive wheel 411 causes sub wheel 431 to turn in clockwise or counter clockwise direction as well. Utilizing sub wheel 431 prevents a user's fingers from being pinched between steering wheel 430 and drive wheel 411 if the user chooses to manually steer the vehicle. In embodiments of the present invention, sub wheel 431 can be easily and quickly coupled with steering wheel 430 by, for example, attaching brackets 432 to the spokes of steering wheel 430.

Figure 5A:
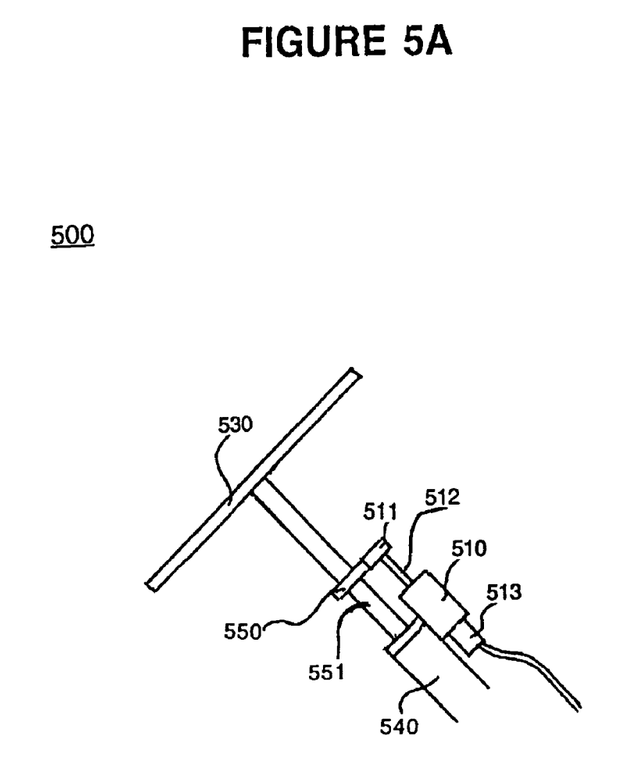
FIGS. 5A and 5B show side and top views respectively of an exemplary system for controlling a mobile machine in accordance with embodiments of the present invention.
Figure 5B:
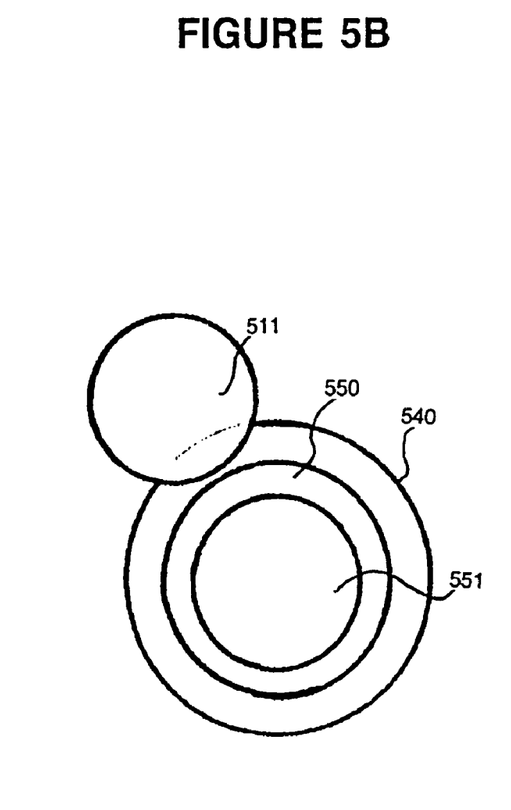

FIGS. 5A and 5B are side and sectional views respectively of a system 500 for controlling a mobile machine in accordance with embodiments of the present invention. In FIG. 5A, the steering component (e.g., electric steering component 131 of FIG. 2) comprises an electric motor 510 which is coupled with gear 511 via shaft 512 and with a motor control unit 513. Motor control unit 413 couples electric motor 510 with steering controller 220 of FIG. 2. In FIG. 5A, electric motor 510 is coupled with steering column 540.

FIG. 5B is a section view of system 500 and shows steering shaft 550 disposed within steering column 540. A gear 551 couples steering shaft 550 with gear 511 of electric steering component 131. In the present embodiment, electric motor 510 turns in a clockwise or counter clockwise direction depending upon the steering command received by motor control unit 513. As a result, gear 511 also turns in a clockwise or counter clockwise direction, thus causing steering shaft 550 to turn due to the force conveyed by gear 551. While the present embodiment recites coupling electric steering component 131 with steering shaft 550 using gears, embodiments of the present invention are well suited for using other mechanical couplings such as a gear and chain, a belt and pulleys, etc.

Figure 6:
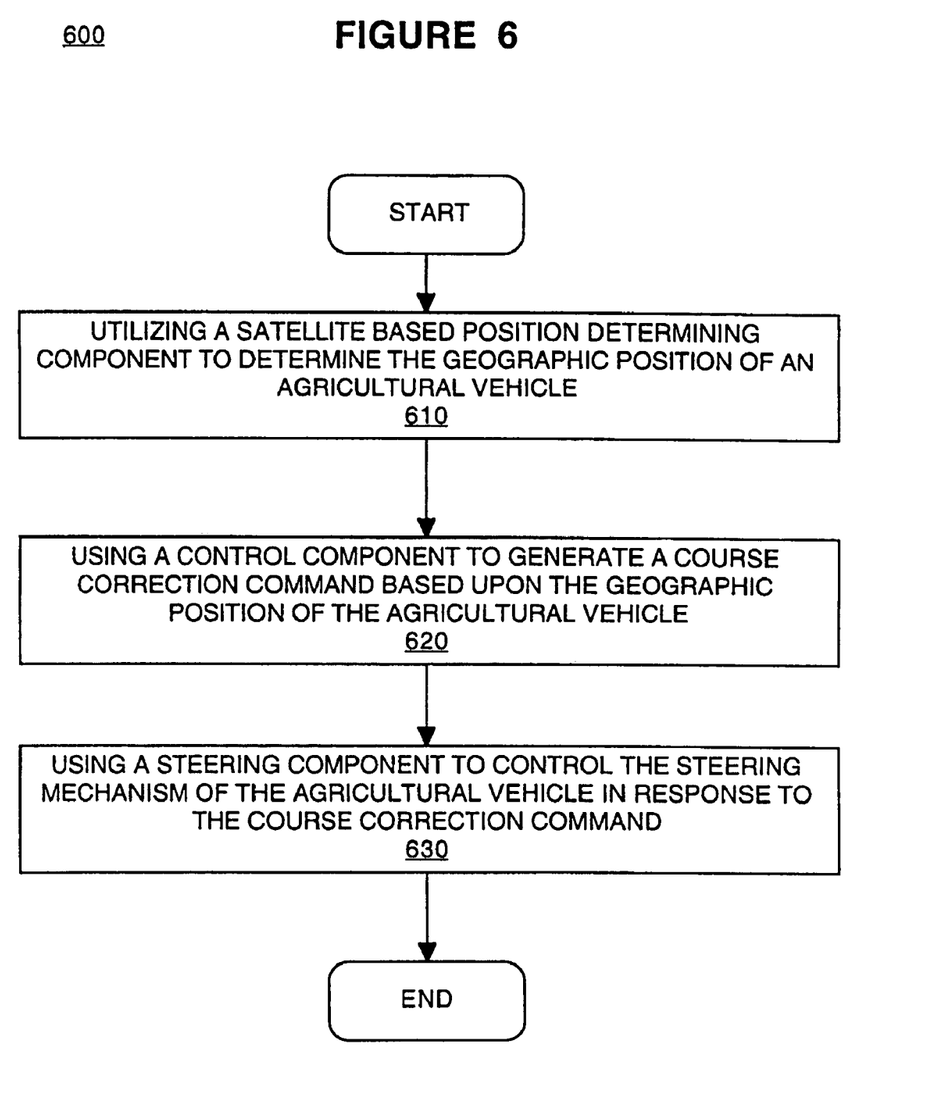
FIG. 6 is a flowchart of an exemplary method for controlling a vehicle in accordance with embodiments of the present invention.

FIG. 6 is a flow chart of a method 600 for controlling an vehicle (e.g., an agricultural, maintenance, utility, commercial vehicle, etc.) in accordance with embodiments of the present invention. In step 610 of FIG. 6, a satellite based position determining component is utilized to determine the geographic position of an agricultural vehicle. As described above with reference to FIG. 1, position determining component 110 is a satellite based position determining system such as global positioning system (GPS) navigation system, a differential GPS system, a real-time kinematics (RTK) system, a networked RTK system, etc. Position determining system determines the location of mobile machine 105 in at least two dimensions in embodiments of the present invention.

In step 620 of FIG. 6, a control component is used to generate a steering command based upon the geographic position of the agricultural vehicle. As described above with reference to FIG. 2, control component 120 is used to generate steering commands for mobile machine based upon geographic data received from position determining component 110. In embodiments of the present invention, control component 120 comprises a vehicle guidance system (e.g., 210 of FIG. 2) which is coupled with a steering controller (e.g., 220 of FIG. 2). Vehicle guidance system 210 uses the position data received from position determining component 110 to determine course corrections for mobile machine 105. Steering controller 220 translates the course corrections into steering commands In step 630 of FIG. 6, a steering component is used to control the steering mechanism of the agricultural vehicle in response to the steering command.

SECTION II

Method and System for Controlling Steering Deadband in a Mobile Machine

Embodiments of the present invention provide a method and system for controlling steering dead band in a mobile machine.

Exemplary Processes

Figure 7:
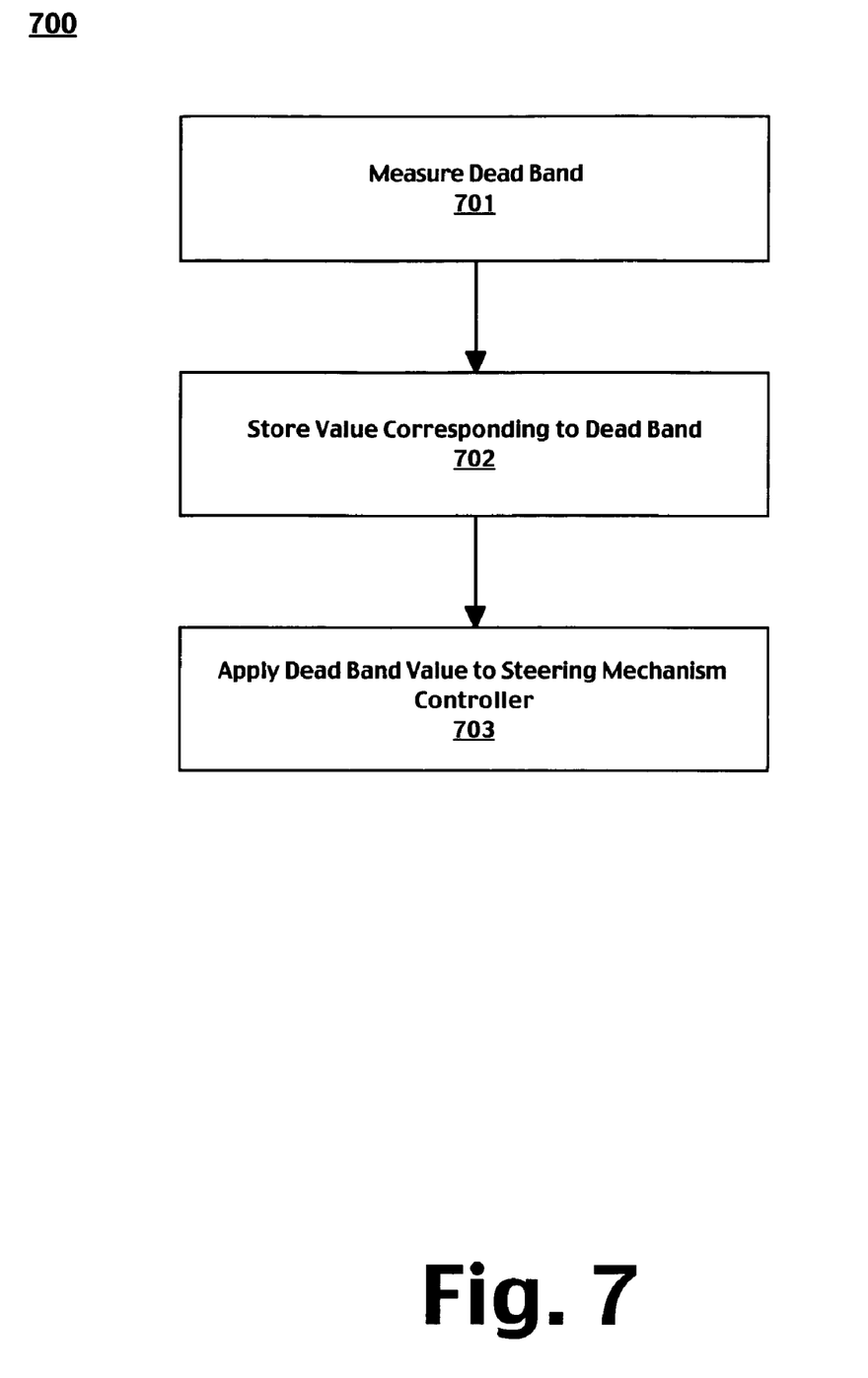
FIG. 7 is a flowchart of an exemplary method for controlling steering dead band in a mobile machine, according to an embodiment of the present invention.

FIG. 7 is a flowchart for an exemplary process 700 for controlling steering dead band in a mobile machine such as a vehicle engaged in activities related to agriculture, maintenance, utility, construction, and/or commerce, according to an embodiment of the present invention. Process 700 begins with step 701, wherein the dead band in the steering mechanism is measured.

In step 702, a value corresponding to the dead band measured is stored, for instance in non-volatile memory, containing for instance stored paths, programmed steering settings and steering mechanism positions, and the like. In step 703, the dead band value is applied to a controller of said steering mechanism, wherein the controller actuates the steering mechanism according to the dead band value, thus compensating for the dead band.

Figure 8:
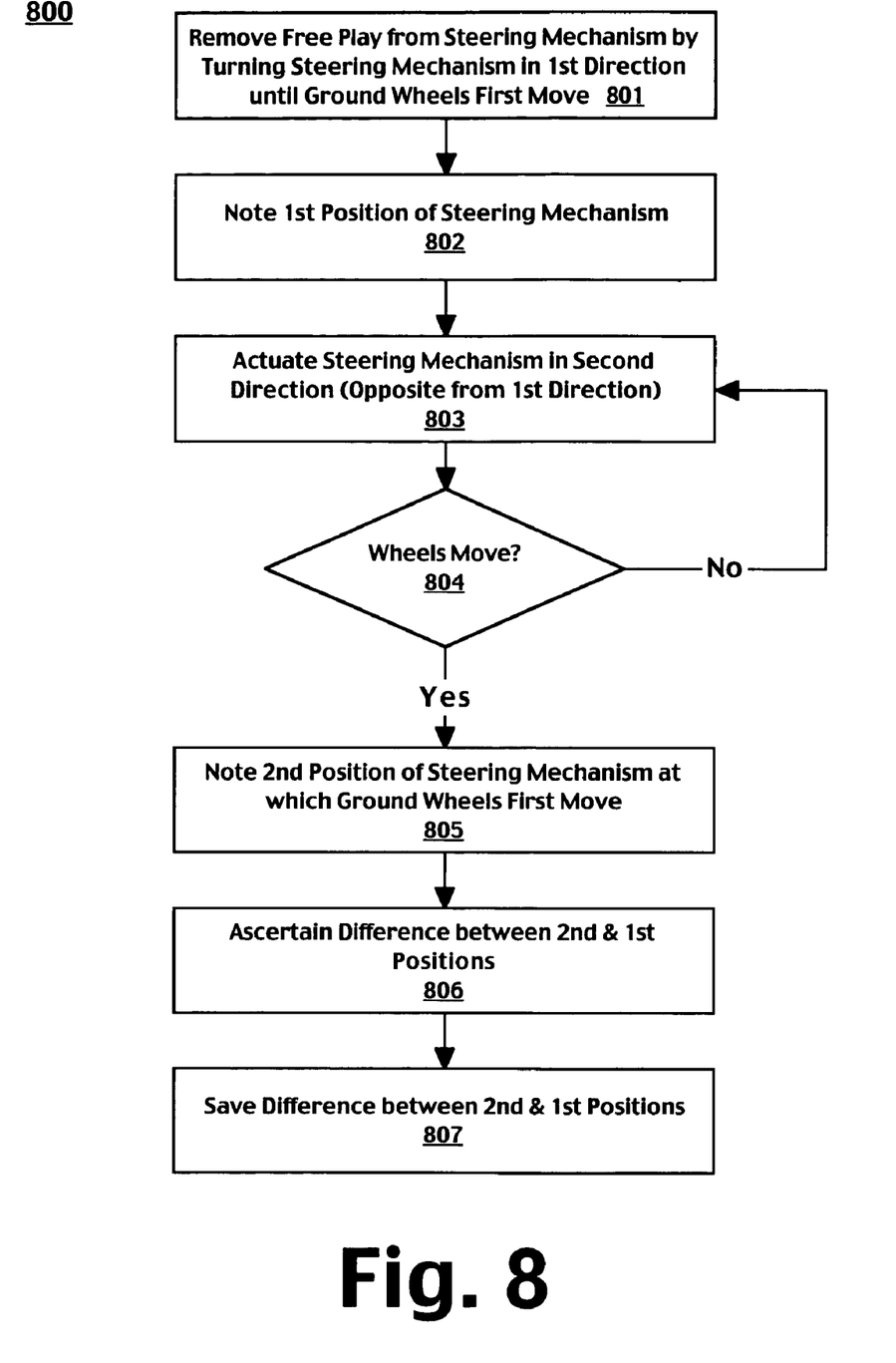
FIG. 8 is a flowchart of an exemplary method for measuring a dead band in a steering mechanism of a mobile machine, according to an embodiment of the present invention.

FIG. 8 s a flowchart for an exemplary process 800 for measuring a dead band in a steering mechanism of a mobile machine, according to an embodiment of the present invention. Process 800 begins with step 801 wherein free play is removed from the steering mechanism. In step 801, the steering mechanism is actuated in a first direction, until responsive movement of the ground wheels of the vehicle is first detected. This is performed partly manually, in one embodiment, such as by an operator of the vehicle. In step 802, the position of the steering mechanism at which motion of the ground wheels is detected is noted, e.g., marked, etc., as an original (e.g. First) position.

With the first position of a steering mechanism component such as a steering wheel so noted, in step 803 the steering wheel (e.g., or other steering mechanism component) is actuated (e.g., turned) in a second direction, opposite from the first direction.

In step 804, movement of ground wheels of the mobile machine, in response to the movement of the steering mechanism in the second direction, is determined. Where no ground wheel movement is detected, step 803 persists (e.g., turning the steering wheel continues in the direction in which turning began). Where responsive ground wheel movement is first detected, in step 805 a second position of the steering wheel, corresponding to the position at which ground wheel motion began responsive to turning the steering wheel, is noted.

In step 806, a difference between the first and second steering component positions is ascertained. The difference between the first and second steering component positions can include one or more measurements, definitions and/or value descriptors.

For instance, the difference between the first and second steering component positions can be given as an angle with its vertex at the center of a steering wheel, wherein the rays of the angle comprise the radius of the steering wheel at the first and second positions, e.g., at the points at which they intersect with the steering wheel circumference. This angular value corresponding to the difference between the first and second steering component positions can be stored and/or applied in any angular measurement form, such as radians, gradients and/or degrees.

The difference between the first and second steering component positions can also be given as an partial circumferential distance corresponding to the portion of the steering wheel circumference scribed by the angle corresponding to the difference between the first and second steering wheel positions. Further, the difference between the first and second steering component positions can be given as the length of a secant scribed by the intersection of the angle corresponding to the difference between the first and second steering wheel positions and the steering wheel circumference. Embodiments of the present invention are well suited to function with the difference between the first and second steering component positions given in any such form, any combination thereof and/or other descriptions thereof.

In step 807, the difference between the first and second positions of the steering mechanism is saved (e.g., stored).

Figure 9:
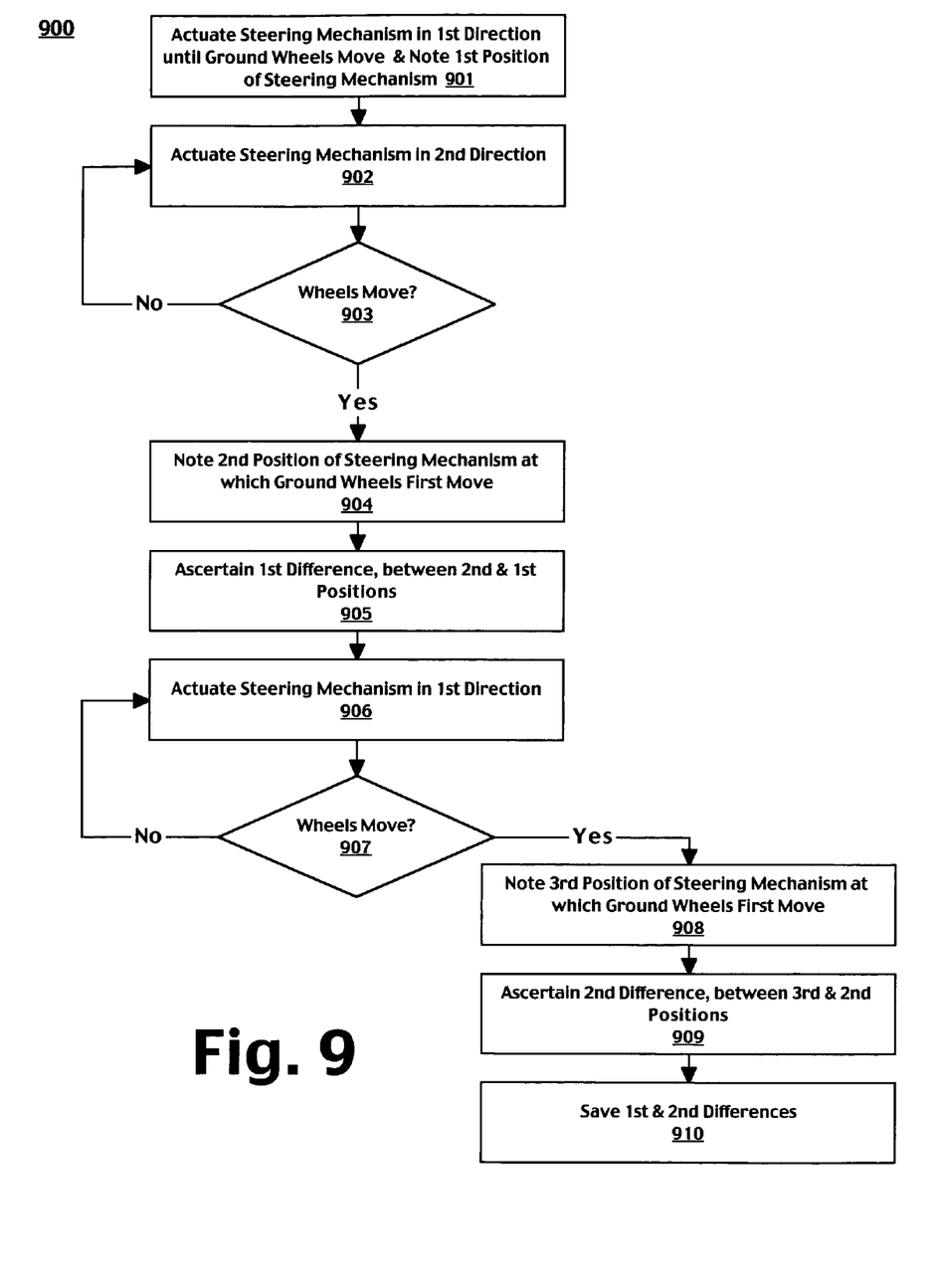
FIG. 9 is a flowchart of an exemplary method for measuring a dead band in a steering mechanism of a mobile machine, according to an embodiment of the present invention.

FIG. 9 is a flowchart for an exemplary process 900 for measuring a dead band in a steering mechanism of a mobile machine, according to an embodiment of the present invention. Process 900 begins with step 901 wherein free play in the steering mechanism is corrected with actuation of the steering mechanism in a first direction until responsive movement of the ground wheels is first detected, at which point a first position of the steering mechanism is noted.

In step 902, the steering wheel or other steering mechanism component is actuated in a second direction, opposite from the first direction.

In step 903, responsive movement of ground wheels of the mobile machine, is determined. Where no ground wheel movement is detected, step 902 persists. Where responsive ground wheel movement is first detected, in step 904 a second position of the steering wheel, corresponding to the position at which ground wheel motion began responsive to turning the steering wheel, is noted.

In step 905, a first difference, between the first and second steering component positions, is ascertained. In step 906, the steering wheel or other steering mechanism component is actuated, again in the first direction.

In step 907, movement of ground wheels of the mobile machine, responsive to operating the steering mechanism, is determined. Where no ground wheel movement is detected, step 906 persists. Where responsive ground wheel movement is first detected, in step 908 a third position of the steering wheel, corresponding to the position at which ground wheel motion began responsive to turning the steering wheel in the first direction, is noted.

In step 909, a second difference, between the third and the second steering component positions, is ascertained. In step 910, the first and second differences are saved (e.g., stored). In one embodiment, the first and second differences are summed and the average taken thereof, to generate an average bidirectional dead band value.

It is appreciated that processes 700-1000 can operate with (e.g., comprising part of, in parallel with, effectively simultaneously with, etc.) a process for controlling a vehicle, or other mobile machine, such as process 600 (FIG. 6, Section I, above).

Figure 10:
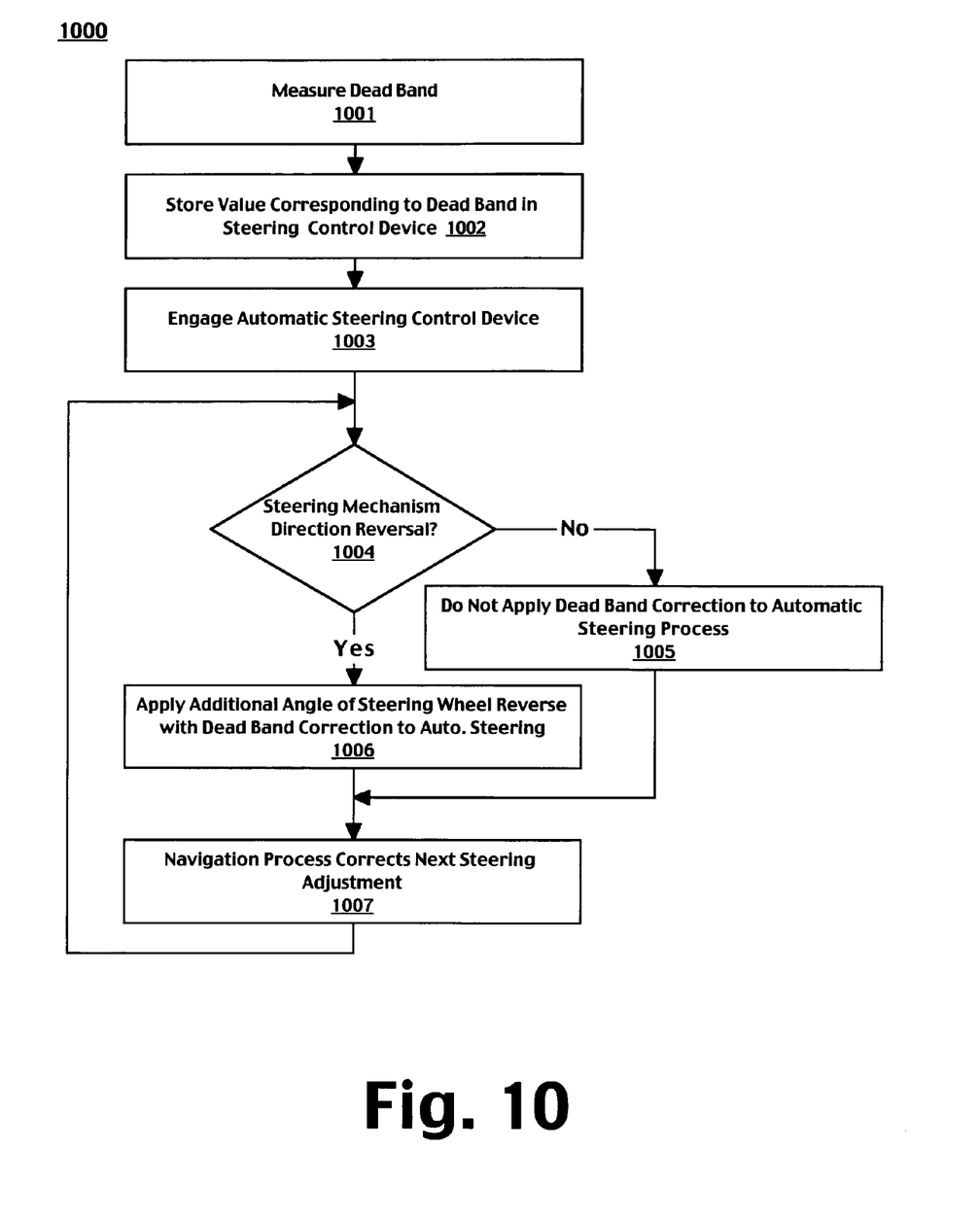
FIG. 10 is a flowchart of an exemplary method for controlling steering dead band in a mobile machine, according to an embodiment of the present invention.

FIG. 10 is a flowchart of an exemplary process 1000 for controlling steering dead band in a vehicle, according to an embodiment of the present invention. Process 1000 begins with step 1001, wherein the dead band associated with the vehicle steering mechanism is measured.

In step 1002, a value corresponding to the dead band measured is stored in an automatic steering control device. In step 1003, the automatic steering control device is engaged to automatically control the steering of the vehicle, e.g., with operating the steering device, such as a steering wheel.

In step 1004, it is determined whether, in automatically operating the steering of the vehicle, a direction reversal occurs in actuating the steering wheel or other steering device. If not, in step 1005, no dead band correction is applied to an automatic steering control process. Where it is determined that a direction reversal occurs in actuating the steering wheel, etc., in step 1006 the additional angle corresponding to the dead band of the steering wheel reversal is added to the automatic steering control process. In either case, the steering is automatically controlled to compensate for the dead band value applied.

Process 1000 can occur with (e.g., in parallel with, effectively simultaneously or concurrently with, and/or as a component of) an automatic navigation process for controlling the vehicle's movement via its steering mechanism (e.g., process 600; FIG. 6). In step 1007, the navigation process corrects the next steering adjustment as needed. Upon correcting the steering adjustment, process 100o loops back and repeats step 1004.

Exemplary System

Figure 11:
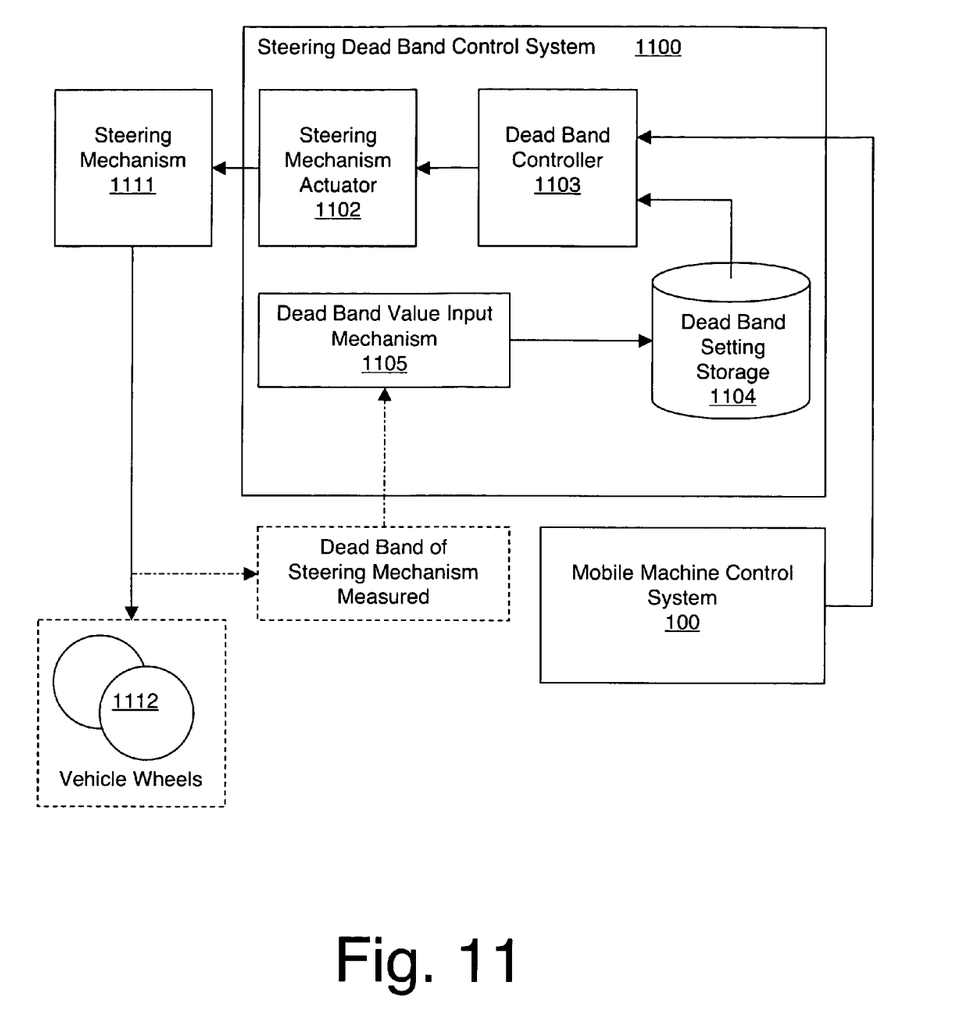
FIG. 11 depicts an exemplary system for controlling dead band in a steering mechanism, according to an embodiment of the present invention.

FIG. 11 depicts an exemplary system 1100 for controlling dead band in the steering mechanism of a mobile machine, according to an embodiment of the present invention. System 1100 controls the dead band of the steering mechanism 1111, which operates the wheels 1112 of the vehicle on the ground to steer the vehicle.

The dead band is measured and provided with input mechanism 1105 to dead band setting storage 1104. Storage 1104 can comprise non-volatile memory such as flash memory, a drive device such as a disk drive, flash drive, etc., a computer readable medium into which values corresponding to the dead band can be recorded, registers, etc.

Dead band controller 1103 retrieves a value corresponding to the dead band from storage 1104 and sends a control signal corresponding to that value to steering mechanism actuator 1102. Steering mechanism actuator 1102 automatically operates steering mechanism 1111 to compensate for the dead band by positioning the vehicle's wheels 1112 per a navigational setting to steer the vehicle on a programmed course, such as a stored path.

In one embodiment, dead band controller 1103 and/or dead band setting storage 1104 comprise a part of control component 120 (FIG. 2). In this embodiment, control processes (e.g., programming instructions in software, firmware, etc.) of dead band controller 1103 (e.g., process 700; FIG. 7) and are shared with, executed in parallel with, effectively concurrently or simultaneously with steering controller 220 (FIG. 2). In one embodiment, process 700 and/or portions of processes 800-1000 (FIG. 8-10, respectively) are performed by a computer system (e.g., system 100; FIG. 1) executing code embodied within a computer readable medium.

In one embodiment, dead band controller 1103 takes an input from mobile machine control system 100 (FIG. 1A), which controls steering the vehicle wheels 1112 according to inputs from a position determining system 110. Thus, dead band control system effectively filters an input from control system 100 to add steering dead band control thereto. In an alternative embodiment, steering mechanism actuator 1102 comprises a component of system 100, and input is provided for its control from dead band controller 1103 of system 1100.

In summary, embodiments of the present invention provide a method and system for controlling steering dead band in a mobile machine. The method includes measuring the dead band, storing a value corresponding to thereto, and applying the dead band value to a controller of a steering mechanism. The steering mechanism is thus controlled according to the dead band value to compensate for the dead band.

A method and system for controlling steering dead band in a mobile machine, is thus described. While the present invention has been described in particular embodiments, it should be appreciated that the present invention should not be construed as limited by such embodiments, but rather construed according to the following claims.

What is claimed is:

1. A steering controller for a vehicle, comprising:
   a guidance mechanism for determining a course correction for said vehicle based upon position data received from a position determining system;
   a steering controller coupled with said guidance mechanism and for generating a first steering command based upon said course correction, and wherein said first steering command is conveyed to one or more of an electric steering component and a hydraulic steering component coupled with a steering mechanism to actuate said steering mechanism to automatically steer said vehicle according to said course correction;
   a dead band value input mechanism coupled to said steering controller and configured to receive at least one dead band value which describes a measured discrepancy between positions of the actuation of said steering mechanism and a corresponding response of the ground wheels of said vehicle;
   a dead band setting storage coupled to said steering controller and configured to store said at least one dead band value; and
   a compensator mechanism coupled to said steering controller and providing thereto said at least one stored dead band value and wherein said steering controller modifies said first steering command to compensate for said measured discrepancy based on said at least one stored dead band value and wherein said modified first steering command is conveyed to one or more of an electric steering component and a hydraulic steering component coupled with a steering mechanism to actuate said steering mechanism to automatically steer said vehicle according to said dead band value.

2. The steering controller as recited in claim 1 wherein said position determining system is one or more of ground based and satellite based.

3. The steering controller as recited in claim 1 wherein said satellite based position determining component is selected from the group consisting of a global positioning system (GPS) system, a differential GPS system, a real-time kinematics (RTK) system, a networked RTK system, a GLONASS system, and a Galileo system.

4. The steering controller as recited in claim 1 wherein said vehicle has application in one or more of agriculture, maintenance, construction, utility, and commerce.

5. The steering controller as recited in claim 1 wherein said electric steering component comprises:
   an electric motor coupled with a steering column of said vehicle; and
   an actuator device coupled with said electric motor and configured to control said steering mechanism.

6. The steering controller as recited in claim 5 wherein said electric motor is selected from the group consisting of a permanent magnet brush direct current (DC) motor, a brushless DC motor, a stepper motor, and an alternating current (AC) servo motor.

7. The steering controller as recited in claim 1 wherein said actuator device comprises a drive wheel which coupled with a steering wheel of said vehicle.

8. The steering controller as recited in claim 1 wherein said electric steering component further comprises a detection component for determining when a user is steering said vehicle and for initiating disengagement of said electric steering component and said hydraulic steering component in response to said determining.

* * * * *

UNITED STATES PATENT AND TRADEMARK OFFICE
CERTIFICATE OF CORRECTION

PATENT NO.        : 7,640,088 B2                                        Page 1 of 1
APPLICATION NO. : 11/019698
DATED             : December 29, 2009
INVENTOR(S)       : Arthur F. Lange It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1224 days.

Signed and Sealed this

Ninth Day of November, 2010

David J. Kappos
*Director of the United States Patent and Trademark Office*